Aug. 30, 1932.  W. E. GHENT  1,874,096
SORTING MACHINE
Filed April 21, 1931
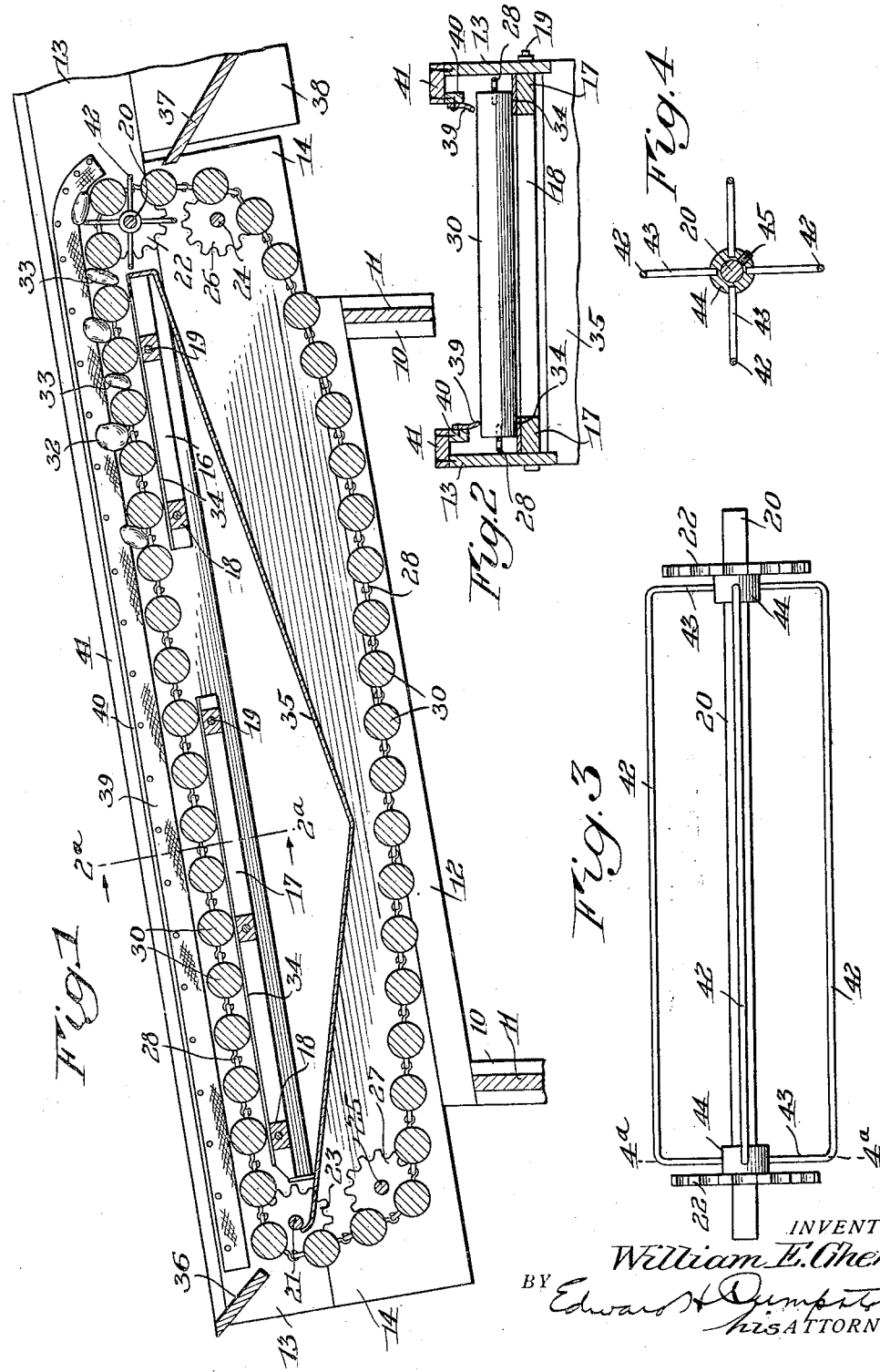
INVENTOR
William E. Ghent
BY Edward H. Dumpston
his ATTORNEY Patented Aug. 30, 1932

1,874,096

UNITED STATES PATENT OFFICE

WILLIAM E. GHENT, OF ATLANTA, NEW YORK, ASSIGNOR TO BOGGS MANUFACTURING CORPORATION, OF ATLANTA, NEW YORK, A CORPORATION OF NEW YORK

SORTING MACHINE

Application filed April 21, 1931. Serial No. 531,690.

The present invention relates to a sorting machine and has for its object to provide an improved machine of this class designed to facilitate the handling or sorting of materials or articles of different varieties, such for example, as fruits, vegetables, and the like.

A further object of the invention is to provide an improved machine of the conveyor type for advancing the articles which may constitute either a sorting or grading machine and which is provided with means for insuring the discharge of the articles from the conveyor at a predetermined point of delivery.

A further object of the invention is to provide in a machine of this class an endless conveyor comprising a plurality of elements for advancing the articles, together with means arranged to eject or discharge from the conveyor any of the articles which, because of their size or shape, or for other reasons, become lodged between or are frictionally held by said advancing elements against discharge by gravity at the delivery end of the conveyor.

A further object of the invention is to provide an improved conveyor comprising relatively movable elements for advancing the articles, arranged to afford periods of shifting and non-shifting of the articles to facilitate inspection and removal of those found to be inferior or defective, in conjunction with means for positively insuring discharge from said advancing elements of the articles at a predetermined point in the travel thereof.

A further object of the invention is to provide a practical and efficient machine of the class described which can be economically constructed and operated.

To these and other ends the invention resides in certain improvements and combinations of parts, all as will be hereinafter more fully described, the novel features being pointed out in the claims at the end of the specification.

In the drawing:

Fig. 1 is a longitudinal sectional elevation through a machine embodying the invention;

Fig. 2 is a transverse section taken on line 2a—2a of Fig. 1;

Fig. 3 is an enlarged detailed view of the ejecting means for the articles shown in conjunction with one of the sprocket shafts of the conveyor; and Fig. 4 is a sectional elevation on the line 4a—4a of Fig. 3.

Similar reference numerals throughout the several views indicate the same parts.

The present invention embodies a machine which while capable of use in the grading or sorting of various articles is especially serviceable in the sorting of different kinds of vegetables and particularly where it is desired to select those of a superior nature, as in the case, for example, of seed potatoes, onions, and the like. An important feature of the invention is the provision of means for insuring positive removal of the articles from the conveyor at the discharge end thereof and particularly those tending to become wedged between or frictionally held by the advancing rollers of the conveyor when approaching or moving into position to discharge the articles by gravity.

In the handling of the potatoes and other vegetables for the purpose of sorting, it is important to provide means for turning or shifting them during advancement in order to permit the operator or attendant to view all parts thereof whereby he may determine which are inferior or defective, whether from decay or for other reasons, and remove the same while advancing. The machine is also adapted to advance the articles for a given period without causing them to move relative to the conveyor in order to make it comparatively easy for the attendant to remove those which are defective or which for any reason are not suitable for the purpose intended.

Referring to the drawing, 10 represents a plurality of spaced upright supports connected by cross members 11 and longitudinally extending side rails 12 secured together by any suitable means and comprising a frame or base for the support of the conveyor mechanism for advancing the articles to be graded or sorted. Superimposed upon the rails 12 are the upper and lower sides 13 and 14 of the frame which are suitably secured to the standards or supports 10. To the inner faces of the upper side members 13 are secured spaced front and rear cleats or strips 16 and 17 respectively, between which are transversely extending struts 18 through which extend tie rods 19 for bracing and tying the frame members together.

Extending transversely between the upper side members 13 and journaled in bearings thereon are front and rear sprocket shafts 20 and 21 respectively, the former being provided with sprockets 22 and the latter with sprockets 23 located adjacent the inner faces of the side members. Similar front and rear sprocket shafts 24 and 25 are extended transversely between and journaled in suitable bearings on the lower side members 14, said shafts being provided respectively with sprockets 26 and 27 which are also located adjacent the inner face of said side members. Separate sprocket chains 28 are carried, one by the four sprockets at one side of the machine and the other by the four sprockets at the opposite side of the machine, the chains being driven preferably by the shaft 21 having on one end thereof a driving element not shown, located outside of one of the frame members 13 which may be a sprocket, pulley or other suitable means.

The conveyor proper comprises a plurality of rollers 30 spaced slightly apart and having their opposite ends recessed to receive pintles 31 which are carried by certain links of the chains. The rollers while advancing the potatoes or other relatively large and small articles. indicated respectively at 32 and 33, are made to rotate about the axes of the pintles through frictional engagement with the supporting strips 34 on the cleats 16 and 17, said strips being preferably formed of material of a flexible nature such as canvas or belting material which is effective for the purpose provided.

As stated above, the conveyor is designed to advance the articles for a predetermined period without causing them to rotate or shift relative thereto in order to facilitate the picking out of those which are defective, or which for different reasons may not be suitable for use. This idea is carried out by spacing the friction or roller operating strips 34 apart as indicated in Fig. 1, so that rotation of the rollers will not take place for a given period during advancement by the sprocket chains, for the reason that the rollers do not contact with the friction strips during this period. With the arrangements shown, the potatoes or other articles are turned or shifted by the rollers both before and after the period of non-rotation of the same and it will be understood that the attendant will have an opportunity to pick out the inferior articles during the rotating as well as the non-rotating periods of the rollers. This order of operation may, however, be changed if desired and the period of non-rotation provided for, either in advance of or subsequent to the period of rotation. It is preferred, however, to have two periods of rotation and an intermediate period of non-rotation as this has been found to be a very satisfactory arrangement.

Means is provided for collecting the dirt and other refuse carried forward by the conveyor belt with the material to be sorted whereby when it drops through the rollers it is prevented from accumulating on the lower run of the belt. This means comprises a receptacle 35 suitably constructed of sheet material and in the form of an open sided pan, the edges of which rest upon and are supported by the side frame members 14 of the machine. By reason of the converging wall portions of the receptacle 35 the dirt or other refuse descending between the overlying rollers will tend to accumulate at the lowest point of the receptacle and can then be readily removed through the open sides of the latter and collected in a suitable receptacle, not shown.

Any suitable means may be provided for the delivery of the materials to the sorting conveyor, such for example, as a conveyor belt, not shown, discharging to a chute 36 at the receiving end of the machine.

At the discharge end of the sorting belt is provided a chute comprising a downwardly inclined plate member 37 and upstanding side plates 38 which may be secured to the side frame members 13 by any suitable means, not shown.

Means is provided for preventing discharge of the articles at the ends of the rollers downwardly upon the driving chains 28 during advancement of the rollers by said chains. This means preferably comprises strips 39 of flexible or yieldable material having their lower edges overlying the rollers inwardly of the opposite ends thereof. The strips are suitably attached to longitudinally extending cleats 40 secured to the bottom sides of the rails 41 carried by and projecting inwardly from the side frame members 13 as shown in Fig. 2.

The means for displacing the articles upon or effecting their discharge from the conveyor is shown in detail in Figs. 3 and 4 and its application is indicated at the right hand end of the conveyor in Fig. 1 which in the present disclosure is the discharge end thereof. At this point the articles of relatively small size, designated by the reference character 33, sometimes becomes lodged between the rollers or are frictionally held thereby so that instead of being discharged by gravity to the chute 37 they are carried past the same. The means for positively displacing or ejecting the articles at this point to insure their discharge to the chute is preferably mounted upon and operated by the transverse shaft 20, the sprockets of which support the chains 28 for advancing the rollers 30. The article displacing means carried by the shaft 20 may be of any preferred design, but I prefer to employ for this purpose the bail-shaped members 42, the bent ends 43 of which are suitably connected with the hubs 44 of the sprockets 22 held upon the shaft 20 preferably by the set screws 45 as shown in Fig. 4. The shaft 20 is provided at its ends with journal portions 46 for operation in bearings, not shown, located on the side frame members 13. With this arrangement the members 42 constitute radially disposed rods extending longitudinally of and equi-distant from the axis of the shaft 20. The rods are in parallel relation to the rollers which operate to advance the articles, said rods being so spaced that they will move successively between the advancing rollers to displace the articles or push them outwardly to insure their discharge by gravity from the rollers as the latter are moved downwardly past the upper end of the chute 37. This method of displacing the articles is particularly desirable with respect to those of a comparatively small size or of such a shape as to become lodged between the rollers and which, in the absence of any displacing or ejecting means therefor would be carried past the receiving chute and downwardly to the bottom of the conveyor.

It will be understood that while I prefer to mount the displacing means upon the upper sprocket shaft 20 as shown, that it may be mounted and operated independently thereof if desired by any suitable means. Furthermore, while the article displacing means shown is designed primarily for operation at the point of discharge of the conveyor and for the purpose stated, it will be understood that in cases where it may become desirable to displace the articles upon the conveyor at other points than that shown, and for other reasons than that of insuring their discharge from the conveyor, the present type of displacing means may be employed if desired.

It will be understood that the displacing means described and claimed herein is also applicable to conveyors having spaced article advancing members other than those of the roller type shown in the drawing.

I claim:

1. In a machine for handling articles, a frame, an endless conveyor thereon comprising spaced rollers for advancing articles, driving chains at the opposite ends of the rollers having parts on which the rollers are free to revolve, one or more sprocket shafts having sprockets thereon engaging the chain to be driven thereby, means in the path of the rollers operating to effect rotation of the same during advancement thereof between predetermined points, and a plurality of bail-shaped rods extending longitudinally of one of the sprocket shafts in spaced relation thereto and having their extremities secured upon the sprockets thereon, said rods being revolved by said sprockets during rotation thereof and successively moved between the rollers to displace the articles carried thereby.

2. In a machine for handling articles, a frame, a conveyor carried by the frame including spaced chains and transversely extending spaced members carried by the chains and arranged to advance the articles and to effect relative movement between the same for a portion of the period of advancement and operating for a different portion of said period to advance the articles without relative movement, a pair of sprockets operated by the chains at a predetermined point in their travel and bail-shaped rods having their ends secured upon the sprockets and arranged to effect displacement of the articles thereon.

3. A device for operation in conjunction with a conveyor mounted for movement upon a frame and having spaced article advancing members, comprising a shaft having journals on its opposite ends arranged for rotation in bearings carried by the frame and provided with sprockets located inwardly of said journals, and a plurality of bail-shaped members having their ends attached to the sprockets and their intermediate portions extending longitudinally of the shaft and arranged upon rotation of the shaft to move between the spaced article advancing members of the conveyor whereby to displace the articles thereon.

4. A device for operation in conjunction with a conveyor mounted for movement upon a frame and having spaced article advancing members, comprising a shaft having journals on its opposite ends arranged for rotation in bearings carried by the frame, sprockets having hubs sleeved on said shaft adjacent said journals, and a plurality of bail-shaped members having their ends connected with the hubs of the sprockets and their intermediate portions extending longitudinally of the shaft in spaced relation thereto and arranged upon rotation of the latter to move between the spaced article advancing members of the conveyor whereby to displace the articles thereon.

WILLIAM E. GHENT.